UNITED STATES PATENT OFFICE.

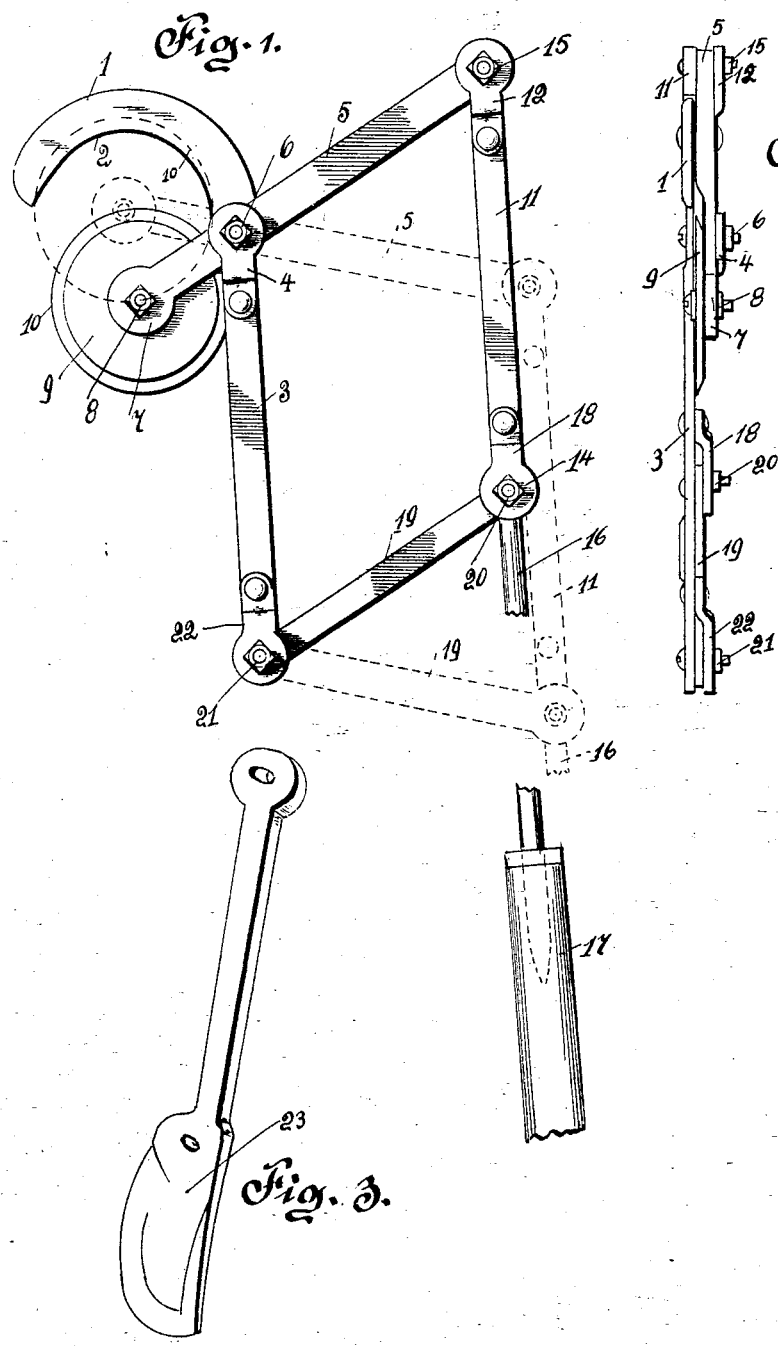

GEORGE B. WRIGHT, OF LEETSDALE, PENNSYLVANIA, ASSIGNOR OF ONE-HALF TO T. W. WRIGHT, OF LEETSDALE, PENNSYLVANIA.

PRUNING IMPLEMENT.

No. 803,953.　　　Specification of Letters Patent.　　　Patented Nov. 7, 1905.

Application filed February 24, 1905. Serial No. 247,096.

*To all whom it may concern:*

Be it known that I, GEORGE B. WRIGHT, a citizen of the United States of America, residing at Leetsdale, in the county of Allegheny and State of Pennsylvania, have invented certain new and useful Improvements in Pruning Implements, of which the following is a specification, reference being had therein to the accompanying drawings.

This invention relates to certain new and useful improvements in pruning implements; and the invention has for its object to provide a novel form of pruning implement which is particularly adapted for pruning or shearing the limbs of a tree.

The pruning implement is constructed upon the principle of toggle-levers, the opposing blades of the implement being carried by pivotally-connected toggle-levers.

The pruning implement is particularly adapted for overhead work which cannot be conveniently reached by a person standing upon the ground or from the tree to be pruned, and I have constructed one of the blades of the implement whereby it can be hooked over the limb or twig to be pruned to partially support the pruning-knife and facilitate the person using the same in operating the knife to cut the limb or twig.

The above construction, together with the details entering into my invention, will be hereinafter more fully described and then specifically pointed out in the claim, and, referring to the drawings accompanying this application, like numerals of reference designate corresponding parts throughout the several views, in which—

Figure 1 is a side elevation of my improved pruning implement, partly broken away. Fig. 2 is an edge view of the same, and Fig. 3 is a detail perspective view of a modified form of knife-blade which can be conveniently used in connection with my improved pruning-knife.

To put my invention into practice, I employ a knife-blade 1 of a substantial hook shape, said blade having a circular cutting edge, as indicated at 2. The shank portion 3 of the blade is provided with a bracket 4, and between said bracket and the shank of the blade is pivotally mounted a lever 5 by a bolt and nut 6. The one end of the lever 5 is enlarged, as indicated at 7, and pivotally attached to said end by a nut and bolt 8 is a circular wheel 9 having a cutting edge 10, and this wheel forms the opposing blade to the hook-shaped blade 1.

The reference-numeral 11 designates a lever which is provided with brackets 12 and 14, and between the end of the lever 11 and the bracket 12 is pivotally connected by a nut and bolt 15 the end of the lever 5. The opposite end of the lever 11 is annular in form, as indicated by the reference-numeral 16, and is preferably screw-threaded, whereby it can be secured in the end of a suitable handle 17. Contiguous to the annular portion 16 of the lever 11 I provide the bracket 14, and the end of a lever 19 is pivotally mounted between this bracket 14 and the lever 11 by a nut and bolt 20. The opposite end of the lever 19 is pivotally mounted by a nut and bolt 21 between a bracket 22, carried by the shank portion 3 and the lower end of said shank portion.

In Fig. 1 of the drawings I have illustrated by dotted lines the position my improved pruning implement assumes when severing a limb or twig from a tree, and when used for this purpose it is only necessary to engage the hooked blade 1 over the limb or twig and pull downwardly upon the handle 17 of the pruning-knife, this movement causing the revoluble cutter-wheel 9 to move into close proximity to the hook-shaped blade 1.

In Fig. 3 of the drawings I have illustrated a knife-blade 23, which may be used in lieu of the rotary cutter-wheel 9, as this form of knife is particularly adapted for small limbs and twigs. In connection with my improved knife I may use a handle comprising a plurality of telescopic sections, which can be conveniently used where different heights are to be reached by my improved knife.

It will be observed from the foregoing description, taken in connection with the drawings, that my improved pruning implement is extremely simple in construction, strong and durable, and comparatively inexpensive to manufacture, and while I have herein illustrated the preferred manner of constructing the same I do not care to confine myself to the particular arrangement of the toggle-levers nor the contour of the hook-shaped blade, as this blade may be readily formed of a substantial size and contour to engage large limbs of a tree.

It will be noted that various changes may be made in the details of construction without departing from the general spirit and scope of the invention.

What I claim, and desire to secure by Letters Patent, is—

In pruning-shears, a shank terminating in a curved cutting-blade, brackets carried on one side face of said shank, a lever pivoted between the upper of said brackets and the shank and provided at its free end with a cutting-blade, a second lever pivoted at its one end between the lowermost of said brackets and the shank, a lever 11 pivoted to the ends of the first-mentioned levers, and having an extension forming an operating-handle, substantially as described.

In testimony whereof I affix my signature in the presence of two witnesses.

GEORGE B. WRIGHT.

Witnesses:
 THEODORE W. WRIGHT,
 WILLIAM SOHN.